US012126665B2

(12) United States Patent
Bharadwaj et al.

(10) Patent No.: US 12,126,665 B2
(45) Date of Patent: Oct. 22, 2024

(54) COMMAND SERVICES MANAGER FOR SECURE SHARING OF COMMANDS TO REGISTERED AGENTS

(71) Applicant: ARRIS Enterprises LLC, Suwanee, GA (US)

(72) Inventors: Akhil Bharadwaj, Karnataka (IN); Remesh Kousalya Sugunan, Karnataka (IN)

(73) Assignee: ARRIS ENTERPRISES LLC, Horsham, PA (US)

( * ) Notice: Subject to any disclaimer, the term of this patent is extended or adjusted under 35 U.S.C. 154(b) by 232 days.

(21) Appl. No.: 17/731,502

(22) Filed: Apr. 28, 2022

(65) Prior Publication Data

US 2023/0013916 A1 Jan. 19, 2023

Related U.S. Application Data

(60) Provisional application No. 63/222,064, filed on Jul. 15, 2021.

(51) Int. Cl.
*H04L 65/61* (2022.01)
*H04L 65/611* (2022.01)

(52) U.S. Cl.
CPC .................. *H04L 65/611* (2022.05)

(58) Field of Classification Search
None
See application file for complete search history.

(56) References Cited

U.S. PATENT DOCUMENTS

| 2016/0357376 A1 | 12/2016 | Carrigan et al. |
| 2021/0152648 A1 | 5/2021 | Matejka et al. |
| 2022/0109669 A1* | 4/2022 | Yuh .................. H04N 21/44227 |

FOREIGN PATENT DOCUMENTS

| WO | 2015/041892 | 3/2015 | |
| WO | WO-2015041892 A1 * | 3/2015 | ............. G10L 15/22 |

OTHER PUBLICATIONS

WO2015041892.*
International Search Report dated Jul. 13, 2022 in International (PCT) Application No. PCT/US2022/026657.
(Continued)

*Primary Examiner* — Cai Y Chen
(74) *Attorney, Agent, or Firm* — Wenderoth, Lind & Ponack, L.L.P.

(57) ABSTRACT

A command services manager of a control device can receive a command from a user interface device and provide for the storing and sharing of the command with one or more service providers so as to provide an improved user experience. Media service providers can register with a network resource associated with the command services manager. The command can be encrypted and stored locally at the control device or remotely at a network resource and be sent to a registered media service provider so that the media service provider can provide improved search responses and/or customize the interaction with the user, recommendation of content availability from other service providers, etc. The command services manager can also receive notifications from the media service provider and provide the notifications to the user, for example, notifications indicative of the success or failure of a command.

20 Claims, 9 Drawing Sheets

(56) References Cited

OTHER PUBLICATIONS

William Haack et al.: "Security Analysis of the Amazon Echo", May 18, 2017 (May 18, 2017), XP055572901, Retrieved from the Internet: URL:https//courses.csail.mit.edu/6.857/2017/project/8.pdf [retrieved on Mar. 21, 2019] Sections 1-3; p. 1-p. 5; figure 1.
International Preliminary Report on Patentability issued Jan. 16, 2024 in corresponding International (PCT) Application No. PCT/US2022/026657.

* cited by examiner

COMMAND SERVICES MANAGER FOR SECURE SHARING OF COMMANDS TO REGISTERED AGENTS

BACKGROUND

As network environments become more complex, users are increasingly expecting integration of all components of the network environment including systems, platforms, devices, etc. For example, users are increasingly utilizing smart speakers or other devices to input voice commands for processing by an associated device. However, these inputs are not generally stored or shared across various providers. Without such features of storing and sharing, user preferences and habits are not learned and the system does not conform to the user. Thus, there is a need to provide an improved user experience by storing and sharing commands so as to match or provide better service to a user.

SUMMARY

According to aspects of the present disclosure there are provided novel solutions for a command services manager to provide the storing and sharing of one or more commands, such as text-based commands, audio-based commands, or both, received via various input or user interface devices. The command services manager receives the one or more commands as one or more inputs from any one or more input or user interface devices. The commands are directed to a media service resource, such as an associated microservice (MS) (also referred to herein as a media service agent) and/or a media service provider for handling. For example, the associated MS or media service agent can communicate with a network resource that can direct the command to the appropriate media services provider, such as a remote application, based on the command or the media service manager can directly send the command to the appropriate media service provider. The media service manager can receive a response from the media service agent and/or a network resource can send a response from the media services provider to the media service manager where either response is based on the command. The command services manager can store a command locally, remotely, such as at a network resource, or both. The command services manager, the network resource, or both can provide information associated with the command, such as the type of command, the command, a timestamp, and/or any other data associated with the processing of the command, to one or more other media services providers that are registered to receive such information. In this way, the user receives an improved experience as the interaction and/or interface with the user can be customized or tailored based on a history of one or more commands and one or more media services providers can provide better responses to the media requests (commands) from a user based on the received information associated with the commands.

An aspect of the present disclosure provides a control device to provide one or more media services providers with one or more commands received from a user. The control device comprises a memory that stores one or more computer-readable instructions associated with a command services manager of the control device and a processor. The processor is configured to execute the one or more computer-readable instructions to perform one or more operations to receive a command from the one or more input devices, determine that the command is associated with a media service resource, wherein the media service resource comprises a media service agent of a plurality of media service agents or a media service provider of a plurality of media service providers, send the command to the associated media service resource, wherein the media service resource processes the command, and store the command.

In an aspect of the present disclosure, the processor is further configured to execute the one or more computer-readable instructions to perform one or more further operations to.

In an aspect of the present disclosure, wherein sending the command to the network resource comprises sending a subscriber identifier associated with the command.

In an aspect of the present disclosure, wherein storing the command comprises storing the command as encrypted data based on a key associated with the control device.

In an aspect of the present disclosure, the processor is further configured to execute the one or more computer-readable instructions to perform one or more further operations to receive a response from the associated media service resource and generate a notification to an output device connected to the control device based on the response.

In an aspect of the present disclosure, wherein the notification comprises a message that indicates at least another media service resource available to process the command.

In an aspect of the present disclosure, the processor is further configured to execute the one or more computer-readable instructions to perform one or more further operations to tag one or more commands received by the media service manager based on a privacy parameter wherein storing the command comprises determining that the command is associated with a tag indicative of data associated with a media query and storing the command based on the determination.

An aspect of the present disclosure provides a method for an audio services manager of a control device to provide one or more audio services. The method comprising receiving the command from the one or more input devices, determining that the command is associated with a media service resource, wherein the media service resource comprises a media service agent of a plurality of media service agents or a media service provider of a plurality of media service providers, sending the command to the associated media service resource, wherein the media service resource processes the command, and storing the command.

In an aspect of the present disclosure, the method further comprises ding the command to a network resource for storing at the network resource.

In an aspect of the present disclosure, the method such that sending the command to the network resource comprises sending a subscriber identifier associated with the command.

In an aspect of the present disclosure, the method such that storing the command comprises storing the command as encrypted data based on a key associated with the control device.

In an aspect of the present disclosure, the method comprises receiving a response from the associated media service resource, and generating a notification to an output device connected to the control device based on the response.

In an aspect of the present disclosure, the method such that the notification comprises a message that indicates at least another media service resource available to process the command.

In an aspect of the present disclosure, the method further comprising tagging one or more commands received by the media service manager based on a privacy parameter, and wherein storing the command comprises determining that the command is associated with a tag indicative of data associated with a media query, and storing the command based on the determination.

An aspect of the present disclosure provides a non-transitory computer-readable medium of a control device storing one or more instructions for receiving one or more commands. The one or more instructions when executed by a processor of the control device, cause the command services manager of the control device to perform one or more operations including the steps of the methods described above.

The above-described novel solution may be implemented at a media services system that includes one or more devices, such as a control device that includes an audio command manager, according to one or more example embodiments. Thus, according to various aspects of the present disclosure described herein, it is possible to provide one or more audio services via an audio command manager that provides an improved user experience. For example, one or more aspects of the present invention allows or provides for relevant content from a content delivery network and/or other over the top applications to be queued up, for recommendations of content available via one or more media service agents, one or more media services providers or one or more network resources, improves user behavior pattern predictions so as to enable e-commerce websites to show relevant content, enables social media websites to connect users with similar interests, habits, or characteristics, any other similar activity, or any combination thereof.

BRIEF DESCRIPTION OF DRAWINGS

In the drawings, like reference numbers generally indicate identical, functionally similar, and/or structurally similar elements.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the examples described herein can be made without departing from the spirit and scope of the present disclosure.

Figure 1:
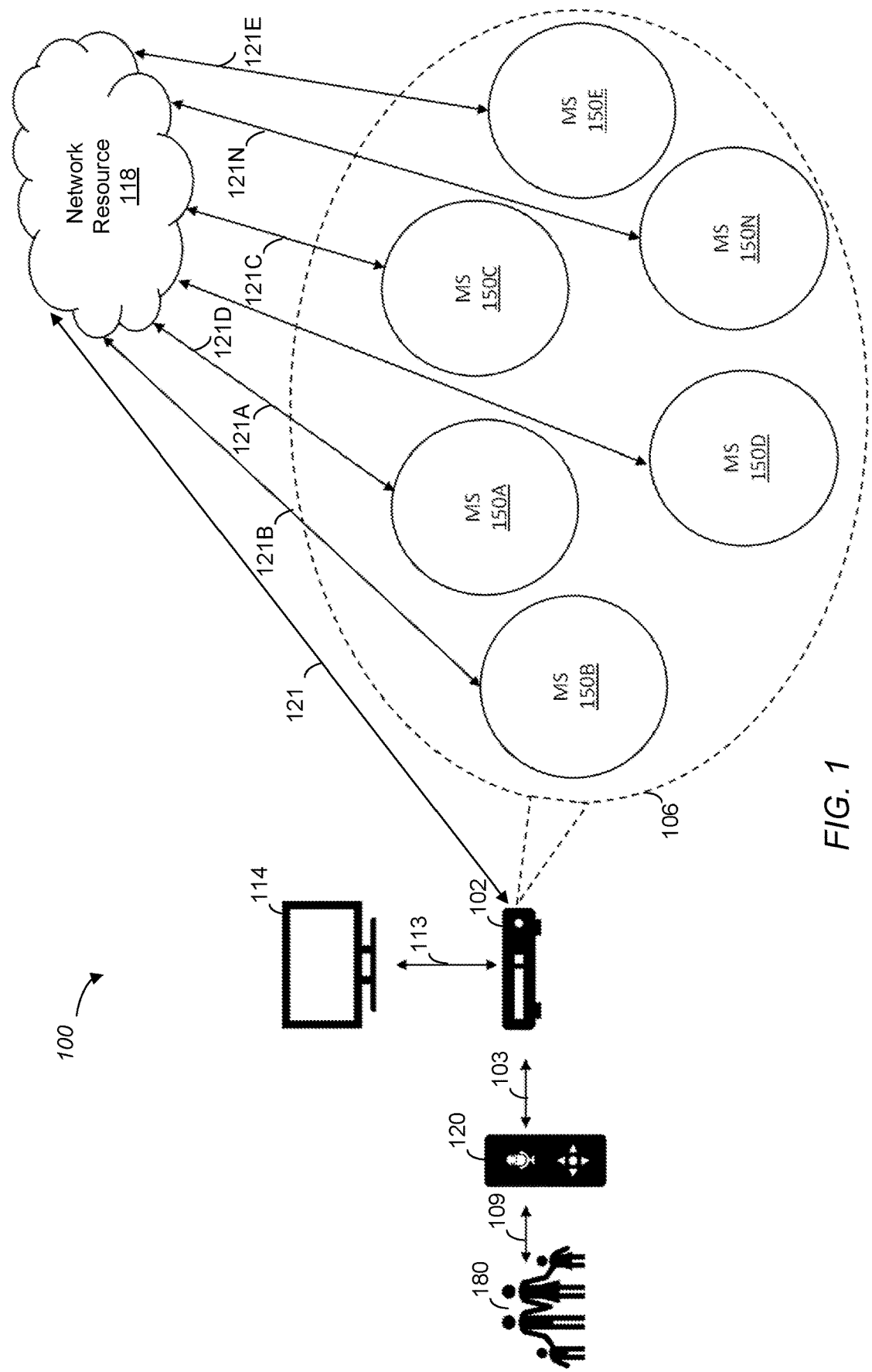
FIG. 1 is a block diagram of a media services system, according to one or more aspects of the present disclosure.

FIG. 1 is a block diagram of a media services system 100, according to one or more aspects of the present disclosure. It should be appreciated that various example embodiments of inventive concepts disclosed herein are not limited to specific numbers or combinations of devices, and there may be one or multiple devices and/or components in the media services system 100, which may itself consist of multiple communication networks and various known or future developed wireless connectivity technologies, protocols, devices, and the like.

The media services system 100 can comprise a network resource 118, a control device 102, an output device 114, a user interface device F, and a user 180. The control device 102 can be connected to the network resource 118 via a connection 121, an output device 114 via a connection 113, and a user interface or input device 120 via a connection 103. The control device 102 can be a set-top box, a centralized device, any other device and/or system for receiving, processing, and/or otherwise analyzing one or more inputs or commands from one or more user interface or input devices 120 and for providing or sending the command to one or more media service resources. The control device 102 can comprise one or more elements and/or components including, but not limited to, a media services array 106 that comprises one or more media service agents 150.

A user, such as a user 180, can provide one or more commands via a connection 109 to one or more user interface or input devices 120. The control device 102 can receive one or more commands from any of the one or more user interface or input devices 120 via a connection 103. The one or more commands can be translated and/or converted based on a type of a command required by any one or more media service resources, such as a text-based command, an audio-based command, any other type of command, or any combination thereof. A media service resource (referred to as 250 in FIG. 2) can comprise one or more media service agents 150, one or more media services providers 260 as discussed with reference to FIG. 2, or both. The command can comprise any of an instruction, a request, any other command, or any combination thereof associated with a user query or request, for example, a search query by a user 180, for content or media from any one or more media service resources, such as one or more media service agents 150, one or more media services providers 260, or both.

The network resource 118 can comprise a server, an information handling system, one or more applications, software, one or more websites and/or uniform resource locator (URL), software as a system (SAAS), a cloud management system, a cloud controller, a network monitoring system, a network reporting and analytics system, a secure network access system, an original equipment manufacturer (OEM) network resource or cloud, any other network management and/or control system, any other type of hardware and/or software for interfacing with a control device 102, or any combination thereof. The network resource 118 can comprise a repository for storing a command and/or information associated with a command received from the control device 102, for example, a command received by the control device 102 from a user 180 via a user interface or input device 120. The information can comprise the command 108, any portion of the command 108, such as a text-only portion, an audio only portion, a converted or translated portion, any data associated with the audio command (such as a timestamp, a subscriber and/or user identifier (ID), a source ID, a media service agent ID associated with a media service agent 150, any other data, or a combination thereof), any other information, or any combination thereof.

The network resource 118 can be connected to the control device 102 via a connection 121, such as a cloud services connection. The network resource 118 can communicate with any one or more media service agents 150 of the control device 102 via the connection 121. For example, the one or more media service agents 150 can comprise media service agent 150A-150N, where N represents any number of microservices or media service agents. While FIG. 1 illustrates several different types of media service agents 150, the present disclosure contemplates that any number (N) of media service agents 150 can be utilized. The following provides examples of media services agents 150 and should not be construed to limit the type of available media service agents 150 applicable to the present disclosure and/or any one or more embodiments.

Media service agent 150A can comprise a network resource microservice or agent that can communicate with a network resource 118, such as to send a command to the network resource 118 and receive a response from the network resource 118 associated with the command, for example, a media content received by the network resource 118 from a media service provider via a connection 121A. Media service agents 150B, 150C, 150D and 150E can comprise one or more media microservices or media service agents that can send an audio command to one or more content providers, such as Amazon, Netflix, YouTube, Disney, etc. and receive a response from the one or more content providers from the network resource 118 via one or more connections 121B, 121C, 121D and 121E, respectively. Media service agent 150N can comprise an over-the-top (OTT) media microservice or media service agent that can send an audio command to one or more OTT media service providers and receive a response from the one or more OTT media service providers from the network resource 118 via a connection 121N. In one or more embodiments, the one or more media service agents 150 can communicate directly with an associated system and/or service, via the network resource 118, or both. Connections 121A-N can comprise any of a single connection 121, one or more separate connections 121, or both. For example, any one or more media service agents 150 can communicate directly and/or indirectly (via network resource 118) using any one or more connections 121.

Figure 2:
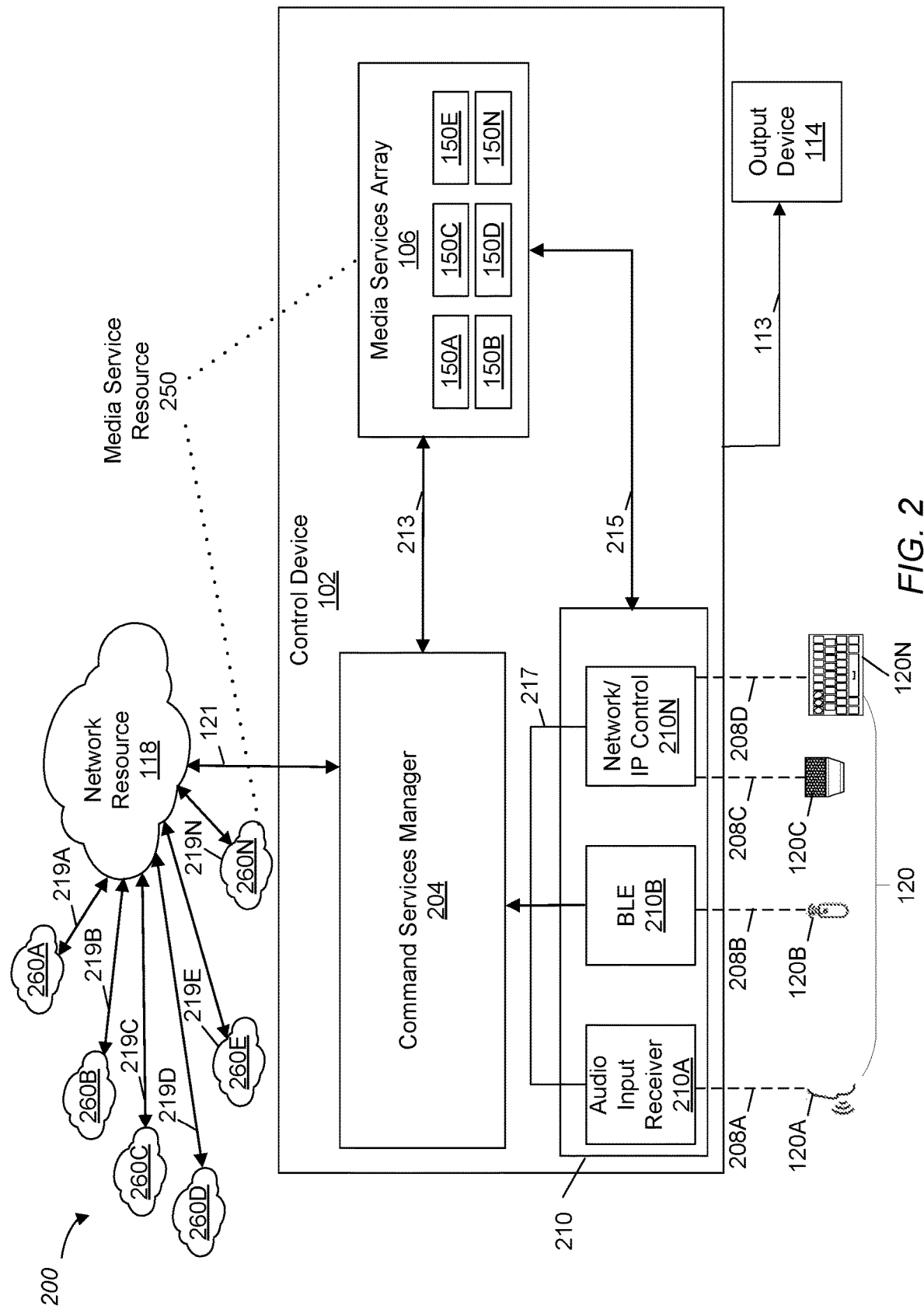
FIG. 2 is a block diagram of a media services system, according to one or more aspects of the present disclosure.

FIG. 2 is a block diagram of a media services system 200 similar to or the same as media services system 100 and/or any one or more media service system discussed herein, according to one or more aspects of the present disclosure. The media services system 200 can comprise a network resource 118, one or more media services providers 260, a control device 102, one or more user interface or input devices 120, and an output device 114. The control device 102 connects to the network resource 118 via a connection 121. Connection 121 can be any type of connection that provides for sending and/or receiving data and can be implemented using a wide area network (WAN), a virtual private network (VPN), metropolitan area networks (MANs), system area networks (SANs), a data over cable service interface specification (DOCSIS) network, a fiber optics network (for example, a fiber to the home (FTTH) or fiber to the x (FTTS), or a hybrid fiber-coaxial (HFC)), a digital subscriber line (DSL), a public switched data network (PSDN), a global Telex network, a 2G, 3G, 4G, 5G, or 6G network or any combination thereof.

The control device 102 can comprise a command services manager 204, one or more input receivers 210, a media services array 106 and/or one or more media service agents 150, any other element or component, or any combination thereof. The command services manager 204 controls the capturing, processing, routing, handling, directing, analysis, or any combination thereof of incoming, received, or otherwise captured one or more commands 208. A command 208 can comprise any type of audio and/or text including, but not limited to, a voice or utterance, a text input, or both. The one or more commands 208 can be received from one or more user interface devices or input 120 that are coupled to the command services manager 204 via one or more input receivers 210. For example, each command 208 can be associated with a user interface or input device 120, for example, a user 120A (where the user 120A can be a person or a device that outputs audio content), a remote control device 120B (for example, a remote control device that includes a voice receiver that allows a user to input a voice input as a command 208 and/or allows a user to enter text as a command 208 and provides for transmission of a Bluetooth (BT), a BLE signal, an infrared (IR) signal, any other signal, or any combination thereof, comprising the command), a smart speaker and/or an audio services device 120C (such as any of an Amazon Echo, Google Nest Smart, Apple HomePod speaker, any other smart device, or combination thereof), a text or tactile interface device 120N (where N represents any number of input or user interface devices 120) such as any of a keyboard, keypad, a touchscreen, any other text-based input device, or any combination thereof. Each command 208 can be received by any one or more input receivers 210. The one or more input receivers 210 are communicatively coupled to one or more user interface or input devices 120 to capture and/or receive one or more commands 208. The one or more input receivers 210 can comprise any type of audio and/or text input receiver 210, for example, any of a microphone receiver 210A (such as a far-field voice (FFV) receiver) for receiving or capturing a command 208A from a user 220A, a BT receiver and/or Bluetooth low Energy (BLE) receiver 210B for receiving or capturing a command 208B from a BLE remote control 120B, a network/internet protocol (IP) control receiver 210N for receiving or capturing a command 208N from an audio services device 120C, a text or tactile interface device 120N, or both, or any combination thereof.

The microphone receiver 210A can receive, capture, and/or process an audio input and provide acoustic processing, such as echo cancellation, wake word detection or both. The BT receiver/BLE receiver/IR receiver 210B can receive, capture, and/or process a BT signal, a BLE signal and/or an IR signal, respectively, from the remote control device 120B. The network/IP control receiver 210N can comprise one or more general voice add-ons, for example, any of one or more extra voice and/or text plugins for one or more devices such as smart speakers, mobile devices, any other voice device, any other user interface device, or any combination thereof that are connected to the control device 102 via the network so as to receive, capture, and/or process a command 208. In one or more embodiments, any one or more of input receivers 210 can be connected via a connection 215 to one or more media service agents 150 and/or media services array 106. For example, the network/IP control receiver 210N can receive a text-based command 208D from a tactile interface device 120 (such as a keyboard) and send the text-based command 208D directly to a media service agent 150 for processing. The media service agent 150 can then send the text-based command 208D to the command services manager 204 via connection 215 so that the command services manager 204 can process, analyze, or otherwise handle the text-based command 208D, for example, by sending the text-based command 208D to the network resource 118 via a connection 121. In one or more embodiments, any one or more input receivers 210 can send one or more commands 208 to the command services manager 204 via a connection 217 and the command services manager 204 can send the command 208 to the network resource 118.

The command services manager 204 can perform one or more operations or functions associated with one or more media or content services associated with one or more media service agents 150, one or more commands 208, or both. The network resource 118 can provide the command services manager 204 with one or more privacy parameters. The one or more privacy parameters can identify one or more types of data, such as one or more commands 208, one or more responses to one or more commands 208, or both, that should not be stored or maintained as part of the information associated with a command 208, including the command 208 and/or a response to the command 208. The command services manager 204 can any of enable, disable, or otherwise control and/or set one or more configurations, or any combination thereof of a media service agent 150. The command services manager 204 can maintain data associated with one or more commands 208, one or more media service agents 150, one or more media services providers 260 or any combination thereof. The command services manager 204 can include an audio to text conversion module, such as an ASR module, so as to convert or translate a received or captured command 208 to a type of command for communication to a selected or determined media service agent 150.

In one or more embodiments, one or more media service agents 150 receive or capture command 208 from an input receiver 210 and send the received or captured command 208 to the command services manager 204 via a connection 213 based on the type of command 208. The connection 213 can provide an interface between the command services manager 204 and any one or more media service agents 150, for example, an application programming interface (API) so as to allow communication between an API of the command services manager 204 and an API associated with a corresponding media service agent 150, such as transmission of one or more commands 208 to one or more media service agents 150 and receipt of one or more responses from the one or more media service agents 150. The command services manager 204 can determine which media service agent 150 of the media services array 106, if any, to direct the command 208. The media services array 106 and/or any one or more media service agents 150 can communicate with the network resource 118 via the connection 121. The network resource 118 can send the received or captured command 208 to one or more media services providers 260 via a connection 219. For example, the one or more media services providers 260 can comprise a social media and/or e-commerce service 260A, a social media service 260B, a content delivery network (CDN) and/or content service provider 260C, an OTT service 260D, an Internet service provider (ISP) 260E, any other SAAS or service provider 260N (such as a data analytics service), or any combination thereof and can communicate with the network resource 118 via connections 219A, 219B, 219C, 219D, 219E, and/or 219N, respectively. In one or more embodiments, the one or more connections 219 comprise a single connection or a plurality of connections and can be a direct/indirect wired/wireless connection.

The control device 102, for example, a command services manager 204, a media services agent 150, or both of the control device 102, can output a notification and/or a response received from a media services provider 260 to an output device 114 via a connection 113. In one or more embodiments, the output device 114 can be part of or included within the control device 102. In one or more embodiments, the output device 114 comprises any of a speaker, a display, any other visual and/or auditory indicator, or any combination thereof. In one or more embodiments, the command services manager 204 can receive a response associated with a command 208 from the network resource 118 and transmit or send the response to the output device 114 via a connection 113.

In one or more embodiments, the command services manager 204 converts or translates the command 208 and/or the audio portion of a command 208 to text. For example, an ASR module of the command services manager 204 can translate or convert the command 208 to a text command and the command services manager 204 selects a media service agent 150 and sends the translated command 208 to the selected media service agent 150. In one or more embodiments, the command services manager 204 can also tag the command 208 as a media command or filter out any non-media commands (such as commands associated with private or personal information or data).

Figure 3:
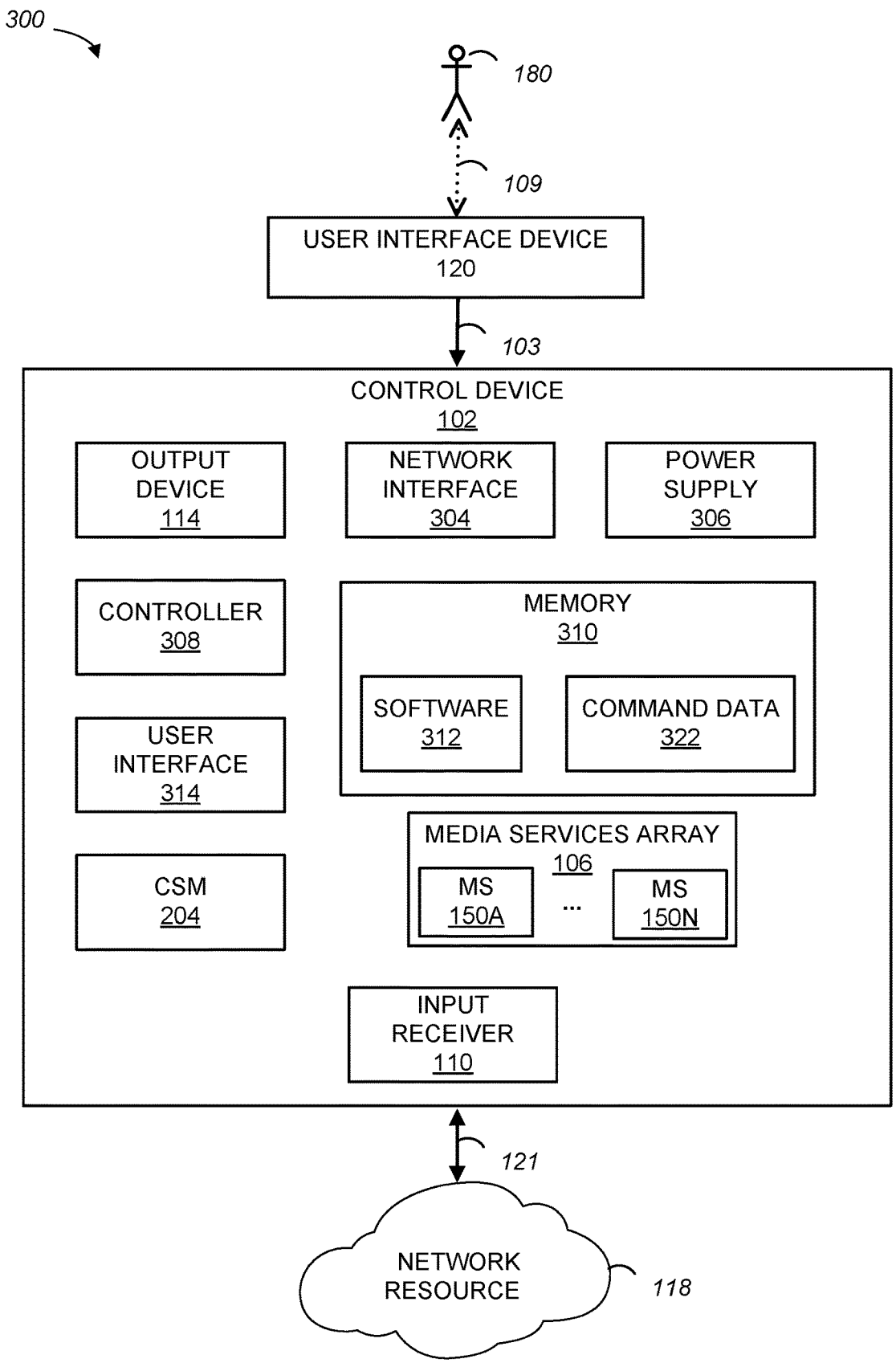
FIG. 3 illustrates a block diagram of a control device within a media services system, according to one or more aspects of the present disclosure.

FIG. 3 illustrates a block diagram of a control device 102 within a media services system 300 similar to or the same as media services system 100 and/or 200, according to one or more aspects of the present disclosure. The control device 102 can comprise one or more elements including, but not limited to, any of an output device 114, a network interface 304, a power supply 306, a controller 308, a user interface 314, a memory 310, a command service manager 204, a memory 310, a media services array 106, an input receiver 210, or any combination thereof.

The output device 114 can comprise any device that provides for the playback and/or reproduction of any of type of content or media, such as any of audio, video, multimedia content, any other content, or any combination thereof, for example, to a user 180 including, but not limited to, any of a speaker, a sound bar, a display (such as a television, a monitor, a projector, and/or any other audio playback device, video playback device, or both), any other device that is capable of providing multi-media, visual, and/or auditory content for consumption by a user 180, or any combination thereof. For example, output device 114 can output or display a response and/or notification received from any one or more media service agents 150, a network resource 118, a media services provider 260, or any combination thereof.

The network interface 304 can include, but is not limited to, various network cards, interfaces, and circuitry implemented in software and/or hardware to enable communications with any of one or more elements of user interface or input device 120, network resource 118, any other device, or a combination thereof using the communication protocol(s) in accordance with any connection, for example, connections 103 and 121. The power supply 306 supplies power to any one or more of the internal elements of the control device 102, for example, through an internal bus. The power supply 306 can be a self-contained power source such as a battery pack with an interface to be powered through an electrical charger connected to an outlet (for example, either directly or by way of another device). The power supply 306 can also include a rechargeable battery that can be detached allowing for replacement such as a nickel-cadmium (NiCd), nickel metal hydride (NiMH), a lithium-ion (Li-ion), or a lithium Polymer (Li-pol) battery.

The controller 308 controls one or more operations of the control device 102 and can comprise any of or any combination of a central processing unit (CPU), a hardware microprocessor, a hardware processor, a multi-core processor, a single core processor, a field programmable gate array (FPGA), a microcontroller, an application specific integrated circuit (ASIC), a digital signal processor (DSP), or other similar processing device capable of executing any type of computer-readable instructions, algorithms, or software including the software 312 stored in a memory 310 for controlling the operation and functions of the control device 102 in accordance with the embodiments described in the present disclosure. Communication between any of the element of the control device 102 can be established using an internal bus.

The memory 310 can comprise a single memory or one or more memories or memory locations that can include, but are not limited to, any of a random access memory (RAM), a dynamic random access memory (DRAM) a memory buffer, a hard drive, a database, an erasable programmable read only memory (EPROM), an electrically erasable programmable read only memory (EEPROM), a read only memory (ROM), a flash memory, logic blocks of a field programmable gate array (FPGA), an optical drive, a hard disk, any other various layers of memory hierarchy, any other non-transitory computer-readable medium, or any combination thereof. The memory 310 can be used to store any type of one or more computer-readable instructions, software, or algorithms including software 312 for controlling one or more functions and operations of the control device 102 in accordance with the embodiments described in the present disclosure and command data 322 associated with any one or more commands 108. In one or more embodiments, software 312 includes one or more applications and/or computer-readable instructions for providing, controlling, processing, and/or otherwise handling data and/or one or more services, such as capturing audio input 108 associated with one or more media service agents 150. Command data 322 can comprise a command 108, any portion of a command 108, any information associated with a command 108 as discussed with reference to FIGS. 1, 2, and 4-9, or any combination thereof.

The user interface 314 can comprise any of one or more tactile inputs (for example, a push button, a selector, a dial, a remote control unit (RCU), etc.), a camera, a keyboard, an audio input, for example, a microphone, a keypad, a liquid crystal display (LCD), a thin film transistor (TFT), a light-emitting diode (LED), a high definition (HD) or other similar display device including a display device having touch screen capabilities so as to allow interaction between one or more users 180 and the control device 102, or a combination thereof. The one or more users 180 can be any of a human, a device with audio output capabilities, or both. In one or more embodiments, the control device 102 is coupled or connected to a user interface or input device 120 via a connection 103 so as to provide and/or receive inputs and/or outputs to and/or from a user 180. In one or more embodiments, the user interface or input device 120 or one or more elements of the user interface device 120 are incorporated within or as part of the control device 102.

In one or more embodiments any of connection 203 or connection 205 can be a bidirectional communication link such that any one or more communications or messages can be sent and/or received by any of the control device 102, the user interface or input device 120, the network resource 118, or any combination thereof. A connection 203 or a connection 205 can be a wired and/or wireless connection.

Further, any, all, or some of the electronic elements or electronic computing devices can be adapted to execute any operating system, including Linux, UNIX, Windows, MacOS, DOS, and ChromOS as well as virtual machines adapted to virtualize execution of a particular operating system, including customized and proprietary operating systems. Any, all or some of the electronic components or electronic computing devices are further equipped with components to facilitate communication with other devices over the one or more network connections to local and wide area networks, wireless and wired networks, public and private networks, and any other communication network enabling communication for the control device 102, the user interface or input device 120, the network resource 118, or any combination thereof. In one or more embodiments, the network resource 118 can comprise a repository for storing any of one or more commands 208, command data 322, any other information, or any combination thereof.

Figure 4:
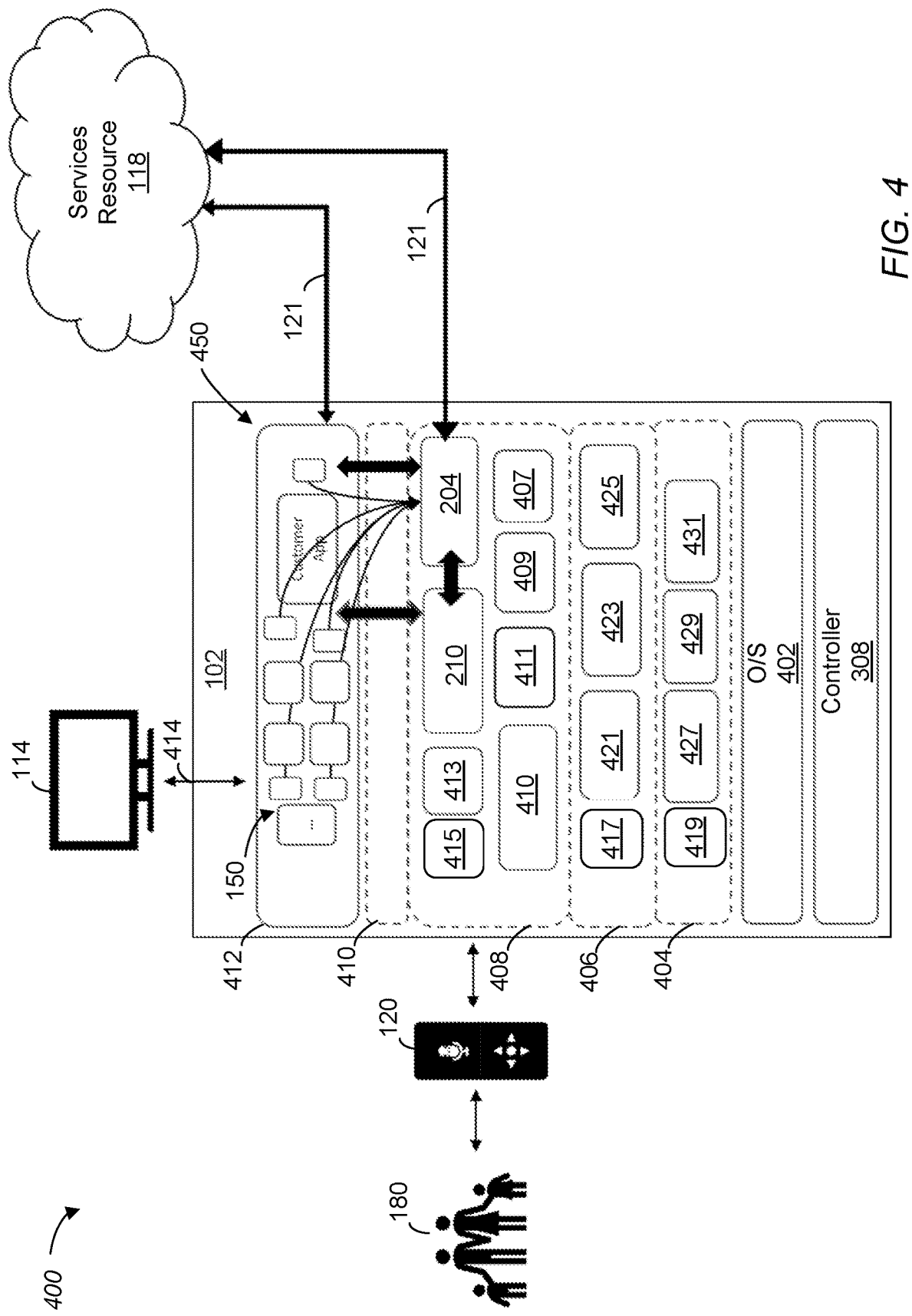
FIG. 4 illustrates a block diagram of various layers of a stack of a control device within a media services system, according to one or more aspects of the present disclosure.

FIG. 4 illustrates a block diagram of various layers of a stack 450 of a control device 102 within a media services system 400 similar to or the same as discussed with reference to FIGS. 1-3, according to one or more aspects of the present disclosure. A stack 450 of control device 102 can comprise a plurality of layers including, but not limited to, an application layer 412, an interface layer 410, a middleware layer 408, a hardware abstraction layer (HAL) 406, and a bottom layer (for example, a coder/decoder (CODEC) layer) 404. The control device 102 can also include an operating system (O/S) 402 that includes one or more computer-readable instructions that when executed by the controller or processor 308 cause the control device 102 to perform one or more operations as discussed herein. In one or more embodiments the CODEC layer or bottom layer 404 can utilize software that performs coding/decoding of one or more signals using, for example, Nexus software by Broadcom Inc.

The application layer 412 comprises one or more media service agents 150, a media services array 106, or both. The one or more media services agents 150 can be integrated with a hypertext markup language (HTML) application or independent native application and/or a customer application. For example, the one or more media service agents 150 can be plug-ins for an application. As an example, Disney can have an HTML application to collect information associated with a Disney media services provider 260 while Netflix can be a standalone application that collects information associated with a Netflix media services provider 260. Any one or more media service providers 260 can provide a plug-in, a software developer kit (SDK), a remote desktop program, platform, or processor (RDP) (for example, a Netflix ready device platform (NRDP)), any other interface or integration tool, or any combination thereof as or part of the one or more media service agents 150.

The middleware layer 408 comprises one or more input receivers 210, a command services manager 204, a storage service 410, a digital living network alliance (Dlna) service 409, a communication support or bridge component 407, a configuration component 411, an application manager component 413, and any other component 415 necessary for the operation of the middleware layer 408. As an example, a user 180 can activate the user interface or input device 120 (for example, press a button and/or make a recognized utterance) which then receives a search query (a command 208) from the user 180. The command 208 is received by an input receiver 210. The audio command handler 408 sends the command 208 (for example, audio data, text data, or both) to a command services manager 204. The command services manager 204 can comprise a voice service, a text service, or both for processing, analyzing, routing, or otherwise handling a command 208. The command services manager 204, for example, can receive a notification from the input receiver 210 that a command 208 was received and can automatically receive or request the command 208 from the input receiver 210. The command services manager 204 can also tag the received command 208 based on the type of command of the command 208. The tags, for example, can indicate the type of query associated with the command 208, whether the command 208 comprises or requests private information, or both. In one or more embodiments, one or more tags indicative of a media query associated with one or more media service agents 150 (one or more microservices) and/or one or more media service providers 260 are stored in a memory 310 of the control device 102 or a network resource 118 whereas one or more tags indicative of data associated with a privacy parameter (such as personal or financial information) are not stored.

The command services manager 204 can interface with one or more command service agents 150 of the application layer 412 via an interface layer 410. The interface layer 410 can comprise a television (TV) extended Interface (TEI) and/or a TV open interface (TOI) to send a command 208 from the command services manager 204 to a command services agent 150 and/or to send a response from a command services agent 150 to the command services manager 204.

The HAL 406 can comprise a HAL decoder 421, a HAL network interface 423, a HAL conditional access (CA) element 425, and any one or more other HAL elements 419. The bottom layer 404 comprises a channel 427, a decoder 429, a graphics agent 431, and any other bottom layer element 419. In one or more embodiments, the command 208, information associated with the command 208, or both can be encrypted by the HAL 406 based on a key associated with the control device 102.

For example, a command 208 can be determined to be associated with one or more media service agents 150 and/or one or more media services providers 260 so as to locate or identify content requested by the command 208, such as a request from a user, provide a recommendation for alternate content, related content, and/or substitute content, and/or identify or provide a different source for the content, or any combination thereof. As an example, an OTT and/or CDN can perform a search of an associated database or repository and can recommend the content using deep link to the content stored in an OTT application. As another example, an e-commerce website can search for one or more products and/or services based on the command 208 and provide one or more identified recommendations to a user. As another example, a social media platform can recommend content, such as one or more persons or contacts, one or more web pages or websites, and/or content based on the command 208. As another example, a data analytics or statistical analysis platform can provide a multiple system operator (MSO) with behavior and/or interest of a user (such as a customer of the MSO) based on the command 208. In this way, a command 208 can be directed to a media service agent 150 and/or a media services provider 260 that can provide the requested content and/or provide, utilize, or otherwise make recommendations related to the request.

Figure 5:
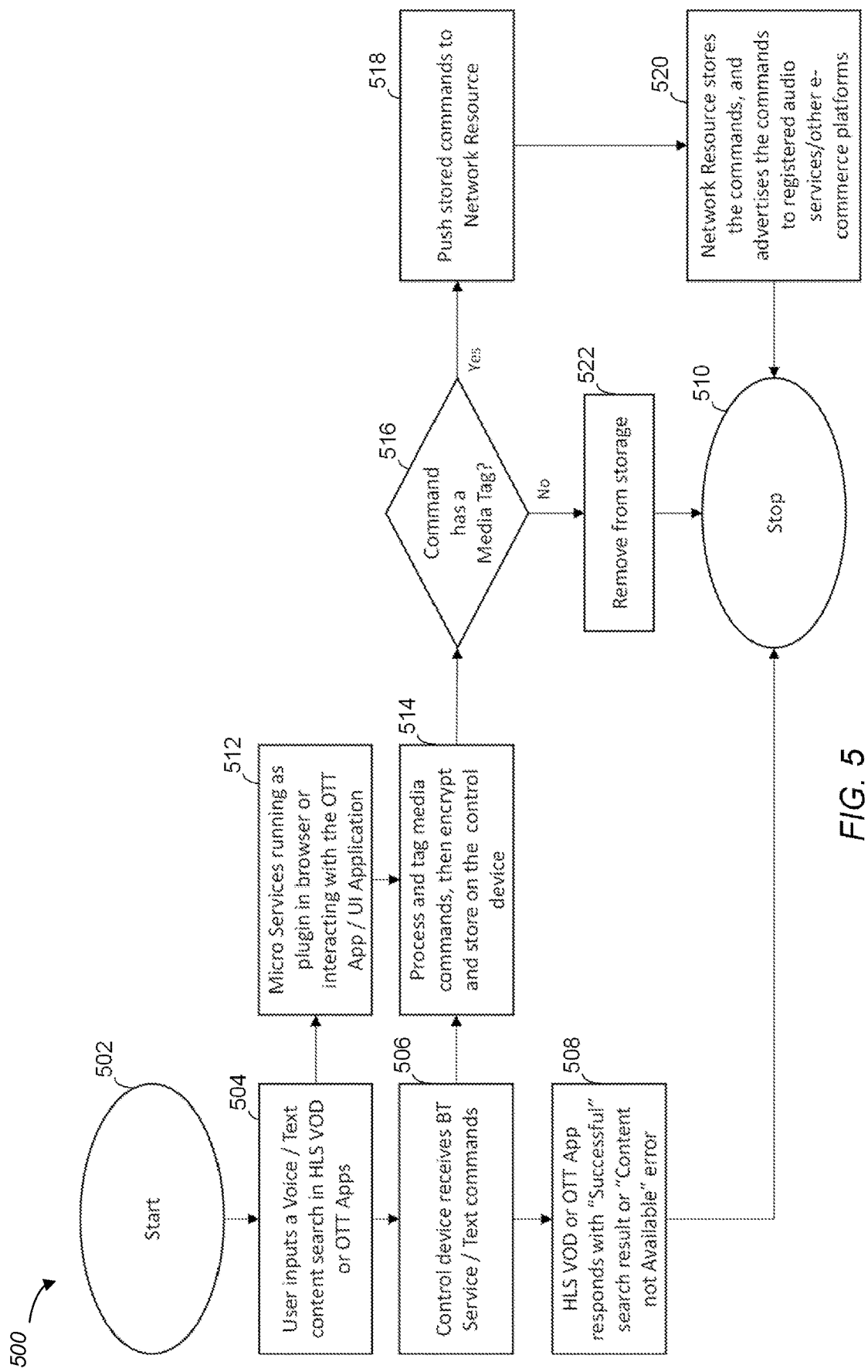
FIG. 5 illustrates an exemplary flow diagram for providing a command to a media service provider, according to one or more aspects of the present disclosure.

FIG. 5 illustrates an exemplary flow diagram 500 for providing a command 208 to a media services provider 260, according to one or more aspects of the present disclosure. For example, a user 180 can be viewing media content at an output device 114 using any type of service provided, by example, from a media services provider 260, such as a hyper-text transfer protocol (HTTP) live streaming (HLS) video on demand (VOD) service or an OTT application associated with a media services provider 260, a media service agent 150, or both. At any time, the user 180 can initiate and/or trigger activation of a user interface or input device 120, such as a remote control device. At step 504, the user can input a request, such as an audio-based input, a text-based input, or both, using the user interface or input device 120. At step 506, the command services manager 204 receives a command or input from the user interface or input device 120 as a command 208. The command services manager 204 sends the command 208 to a media service resource 250, such as the media service agent 150 and/or the media services provider 260, based on the command 208, such as a determined type of command 208. At step 508, the command services manager 204 receives a response from media service resource 250. The response can comprise a status parameter that indicates the status of the command 208, such as any of that the command 208 executed successfully, failed to execute, caused or incurred an error, included a request for media and/or content that is not available, any other status, or any combination thereof. The process ends at step 510.

Additionally, simultaneously with, at or about, or in lieu of execution of steps 506-508, the command services manager 204 at step 512 can after receiving the command 208 from step 504 send or transmit the command 208 to one or more media service agents 150 (or microservice) associated with the command 208. The one or more media service agents 150 can be running as a plug-in in a browser and/or interact with an OTT application or user interface application directly and/or indirectly via network resource 118. At step 514, the command services manager 204 can tag the command 208, encrypt the command 208, store the command 208 at the control device 102 and/or the network resource 118, perform any other processing, analysis, or handling of the command 208, or any combination thereof.

In one or more embodiments, the command services manager 204 can at a predetermined time interval, expiration of a timer, based on a user input, a setting, a semaphore, any other criteria, or any combination thereof, upon receipt of a network resource request, or any combination thereof determine whether the stored command 208 has a tag indicative of the type of command and/or requested media of the command 208. For example, the tag can indicate that the command includes private or restricted information (such as financial or personal), media-only information, any other type of information or content, or any combination thereof. If the tag associated with the stored command 208 indicates private or restricted information, then at step 522 the command 208 is removed from storage, for example, erased or deleted from memory 310. If the tag associated with the stored command 208 does not include or does not indicate restricted or private information, then at step 518 the command services manager 204 pushes the stored command 208 to the network resource 118. The network resource 118, at step 520, can then store the received command 208, advertise or send the command 208 to one or more registered media service providers 260, such as a content provider, a content delivery network, an e-commerce platform, or any combination thereof. A media services provider 260 can register with the network resource 118 to receive one or more commands 208 that are associated with any one or more media service providers 260, one or more media service agents 150, or both associated with any user 180, such as a subscriber to one or more media service providers 260. In this way, a media services provider 260 can analyze commands from various users 180, for example based on a subscriber identifier, to provide an enhanced user environment. For example, a media services provider 260 can suggest/recommend media or content and/or searches to a user 180 based on the received one or more commands 208.

Figure 6:
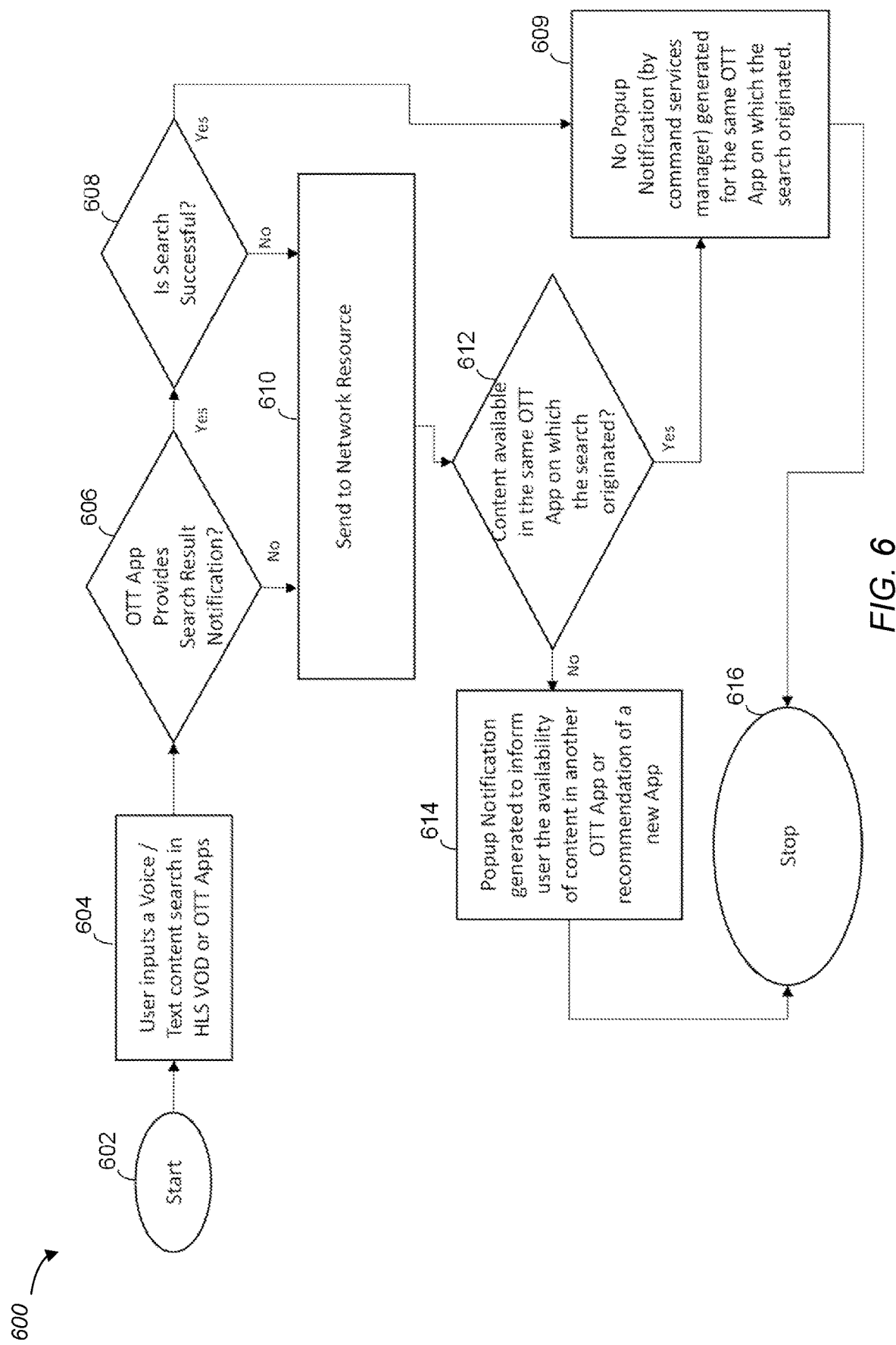
FIG. 6 illustrates an exemplary flow diagram to provide a notification associated with a command, according to one or more aspects of the present disclosure.

FIG. 6 illustrates an exemplary flow diagram 600 to provide a notification associated with a command 208. The process starts at 602 where, for example, user 180 is within proximity of a user interface or input device 120. At step 604, the user 180 inputs or enters a voice- and/or text-based content search via the user interface or input device 120. For example, the content search can be a command 208 sent to a command services manager 204 associated with a media service resource 250, such as a media services provider 260 (such as an HLS VOD service or an OTT application) and/or a media service agent 150. At step 606, the command services manager 204 determines if a media services provider 260 and/or a media service agent 150 returned a result and/or a response notification associated with the content search. If a result and/or a response was not received, the process continues at step 610. For example, a media services provider 260 may not provide a result and/or a response notification if the content associated with the content request is available at the media services provider 260. If a result and/or a response notification was received, then at step 608 it is determined if the result and/or the response indicates that the content search was successfully executed. If the content search was not successfully executed the process continues to step 610 and if the content search was successfully executed the process continues to step 609.

At step 610, the command services manager 204 sends the content request (or command 208) to the network resource 118. At step 612, the network resource 118 determines if the content or media associated with the content request is available at the same media services provider 260 of step 604. If the content is not available, at step 614, the command services manager 204 receives an instruction from the network resource 118 to generate a notification to the user 180, for example, a pop-up message or notification that is displayed or otherwise handled by the output device 114 is generated to inform the user 180 that content or media associated with the content request (or the command 208) is available from another media services provider 260 or a new media services provider 260 and the process ends at step 616. If the content is available, then at step 609 no notification is generated by the command services manager 204 and the process ends at step 616.

Figure 7:
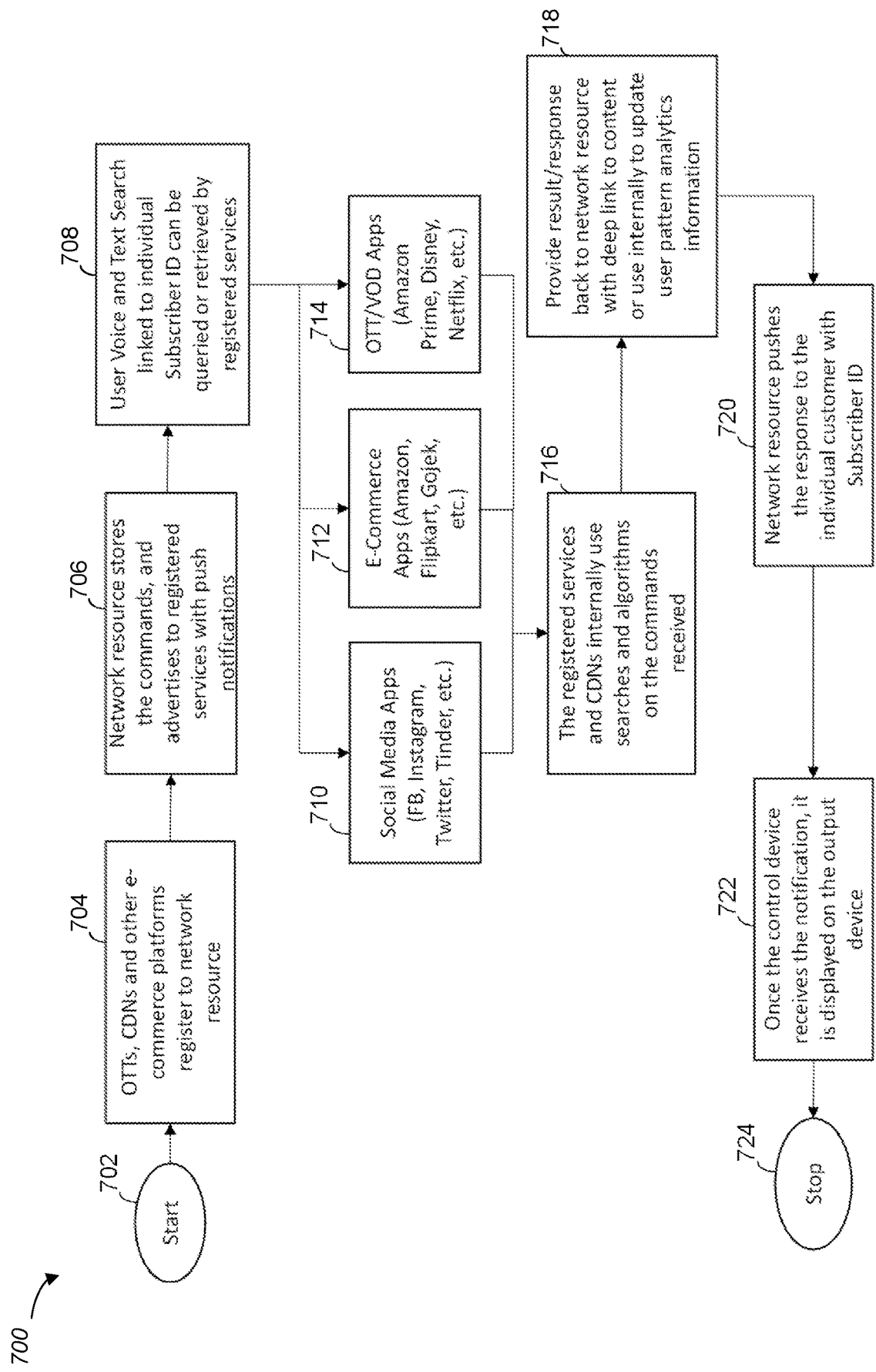
FIG. 7 illustrates a flow diagram for providing one or more commands to one or more media service providers, according to one or more aspects of the present disclosure.

FIG. 7 illustrates a flow diagram for providing one or more commands 208 to one or more media service providers 260, according to one or more aspects of the present disclosure. The process begins at step 702, for example, a control device 102 is connected to a network resource 118.

The control device 102 comprises a command services manager 204 that interfaces with one or more media service agents 150 and/or one or more media service providers 260 to provide responses or results associated with a command 208 received from a user 108. At step 704, one or more media service providers 260 register with the network resource 118. In one or more embodiments, a network resource 118 can be a provider of or otherwise associated with the control device 102. For example, a user 180 can subscribe to a service of the network resource 118 and/or network resource 118 can be a cloud repository for storage and/or providing one or more services for the control device 102. The registration allows the one or more media service providers 260 to access or receive information associated with a user 180, such as a subscriber identifier, a control device 102, one or more commands 208, or any combination thereof.

At step 706, the network resource 118 stores the one or more commands 208 received, for example, from the control device 102, and advertises to one or more registered media service providers 260 with one or more push notifications the one or more commands 208. The network resource 118 can receive, at step 708, a query or request from any one or more registered media service providers 260 for any of one or more commands 208 associated with a type of command, a user 180 (such as a subscriber identifier associated with the one or more commands 208), any other parameter, or any combination thereof. For example, the command services manager 204 can send the command 208 that comprises a subscriber identifier associated with the command 208 to the network resource 118. In one or more embodiments, the network resource 118 can direct the command 208 to one or more media service providers 260 based on the subscriber identifier.

Steps 710, 712 and/or 714 can occur separately, substantially simultaneously, sequentially, or in any order or sequence and correspond to one or more media service providers 260. At step 710, a media services provider 260 comprises one or more social media applications, such as Facebook, Instagram, Twitter, Tinder, etc.), and receives one or more commands 208 and/or information associated with the one or more commands 208 based on the query or request from step 708. At step 712, a media services provider 260 comprises an e-commerce application, such as Amazon, Flipkart, Gojek, etc., and receives one or more commands 208 and/or information associated with the one or more commands 208 based on the query or request from step 708. At step 714, the media services provider 260 comprises one or more OTT/VOD applications, such as Amazon Prime, Disney, Netflix, etc., and receive one or more commands 208 and/or information associated with the one or more commands 208 based on the query or request from step 708.

At step 716, the one or more registered media services providers 260, which can include one or more content delivery networks, internally use the received one or more commands 208 and/or information associated with the one or more commands 208 as an input to one or more searches and/or one or more algorithms at the one or more media service providers 260. At step 718, the one or more media services providers 260 provide a result and/or response from the one or more searches and/or one or more algorithms to the network resource 118. The result and/or response can comprise a deep link to content or can be used internally by the network resource 118 to update user pattern analytics and/or any other information. At step 720, the network resource 118 pushes the received result and/or result to the user 180, for example, a customer with a subscriber identifier. At step 722, the control device 102, or a command services manager 204 of the control device 102, receives the response and/or result. This response and/or result can be received as a notification that can be displayed at an output device 114 of or connected to the control device 102 within proximity of the user 180. For example, a media services provider 260 processes the command 208 and response to a network resource 118 with a recommendation for content to send to the user 180. The recommended content is then sent from the network resource 118 to the control device 102 for display at an output device 114. In one or more embodiments, the recommended content can be sent directly to the output device 114. The process ends at step 724.

Figure 8:
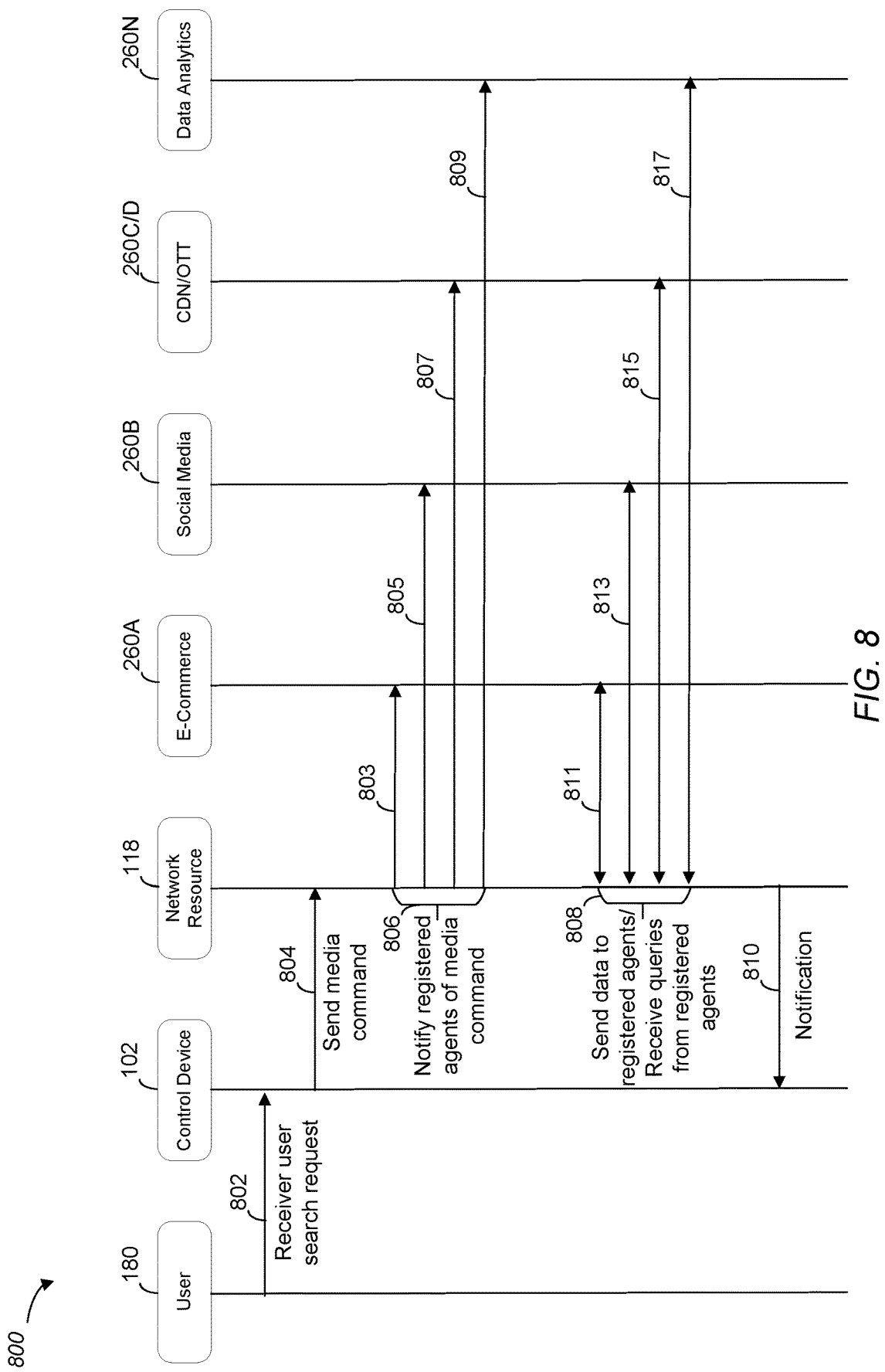
FIG. 8 illustrates a flow diagram of sending a notification associated with one or more audio commands to one or more registered media service providers, according to one or more aspects of the present disclosure.

FIG. 8 illustrates a flow diagram 800 of sending a notification associated with one or more audio commands 208 to one or more registered media service providers 260, according to one or more aspects of the present disclosure. A user 180 can be within proximity of a user interface or input device 120 that can interface with a control device 102. A control device 102 can receive a search request 803 from the user 180. The control device 102 can send the search request as a media command 804 (for example, a command 208) to the network resource 118 connected to the control device 102. The network resource 118 can send a notification 806 to one or more registered media service providers 260 for the content requested by the media command 804. For example, the media command 804 can be sent as a request 803 to an e-commerce service 260A, a request 805 to a social media service 260B, a request 807 to a CDN/OTT service 260C/D, a request 809 to a data analytics service 260N, or any combination thereof. Any one or more media commands 804 can be stored at the control device 102 and/or the network resource 118. The network resource 118 can send and/or receive one or more communications 808 from any one or more registered media service providers 260. For example, any one or more stored media commands 804 can be sent automatically or in response to a query from any one or more registered media service providers 260. As an example, any one or more stored media commands 804 can be sent as a communication 811 to an e-commerce service 260, a communication 813 to social media service 260B, a communication 815 to CDN/OTT 260C/D, a communication 817 to a data analytics service 260N, or any combination thereof.

At step 810, if a network resource 118 is unable to locate content associated with the command 208 and/or the content is not available, the network resource 118 can send a notification, such as a popup notification, to the control device 102 for display at an output device 114. The notification can provide a user 180 with information associated with the failure of the command 208, for example, that particular content associated with the command 208 is not available and/or within the subscription to one or more services and/or service providers 260 associated with the user 180. While step 810 is shown after steps 802-808, the present disclosure contemplates that the notification 810 can be sent from the network resource 118 before or after any step based on any failure including, but not limited to, failure of a media service 260 to handle a media command.

Figure 9:
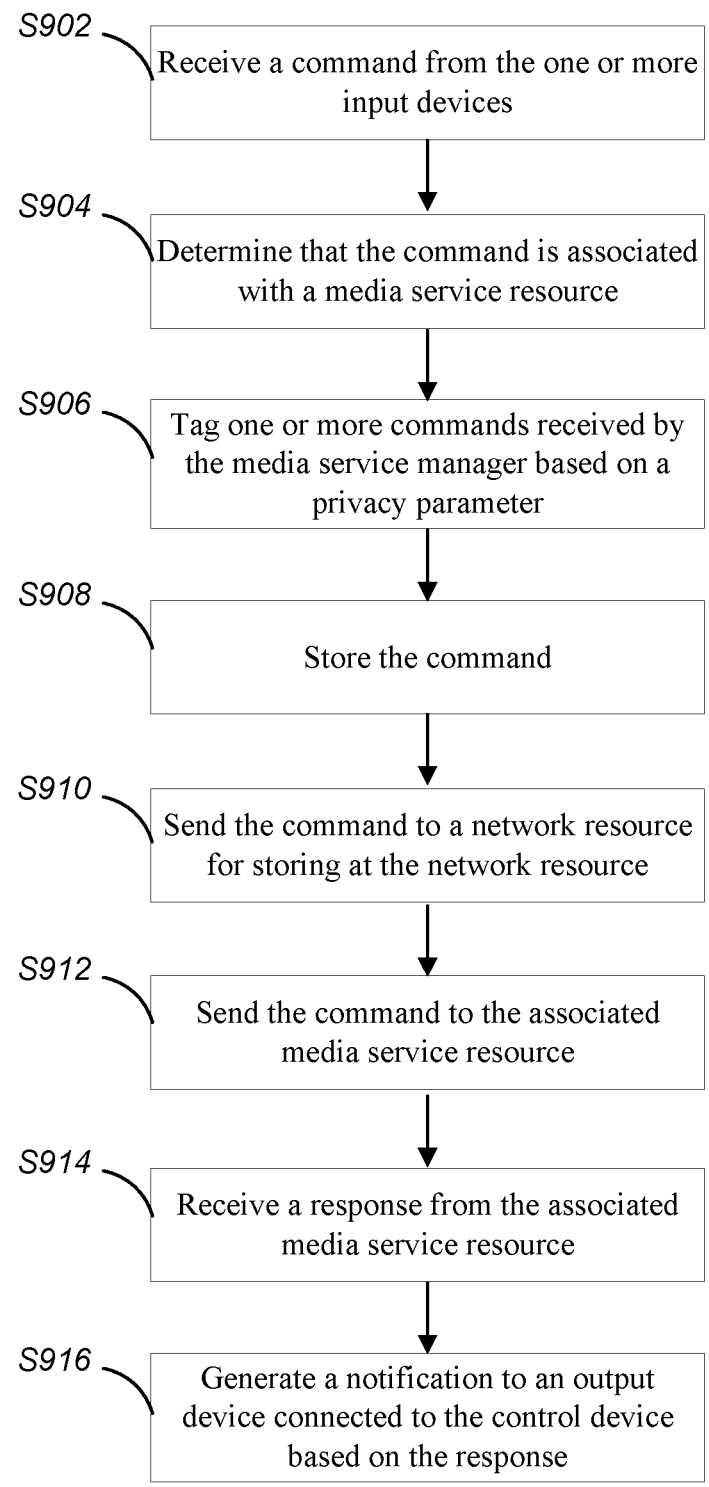
FIG. 9 illustrates a flow diagram for providing one or more commands to a network resource from a control device, according to one or more aspects of the present disclosure.

FIG. 9 illustrates a flow diagram for a command services manager 204 of a control device 102 to receive one or more commands 208, according to one or more aspects of the present disclosure. In one or more embodiments, a control device 102 may include a processor or controller 308 that can be programmed with or to execute one or more to perform steps for receiving a command 208 associated with a user search request for processing, analyzing, or other handling by a command services manager 204 and/or for sending to a network resource 118 for storage and/or providing to one or more registered media service providers 260. In FIG. 9, it is assumed that the devices include their respective controllers and/or processors and their respective software stored in their respective memories, as discussed above in reference to FIGS. 1-8, which when executed by their respective controllers perform one or more functions or operations in accordance with the example embodiments of the present disclosure.

The processor and/or controller 308 executes one or more computer-readable instructions, stored in a memory, for example, a memory 310 of a control device 102, that when executed perform one or more of the operations of steps S902-S916. In one or more embodiments, the one or more computer-readable instructions may be one or more software applications. While the steps S902-S916 are presented in a certain order, the present disclosure contemplates that any one or more steps can be performed simultaneously, substantially simultaneously, repeatedly, in any order or not at all (omitted).

A control device 102 can be connected to one or more input or user interface or input devices 120 that can be used, for example, by a user 180, to input a request or command 208 for one or more media services associated with one or more media service agents 150, one or more media services providers 260, or both. At step S902, a command 208 is received from one or more input or user interface or input devices 120 by one or more input receivers 210. In one or more embodiments, the one or more input receivers send the command 208 to the command services manager 204, to a media service agent 150, a media services array 106, or any combination thereof.

At step 904, the command services manager 204 determines that the command 208 is associated with a media service resource 250. The media service resource 150 can comprise a media service agent 150 of a plurality of media service agents 150, a media service provider 260 of a plurality of media service providers 260, or both. In one or more embodiments, one or more media service providers 260 are connected to the control device 102 and/or the command service manager 204 via a network resource 118. In one or more embodiments, the determination that the command 208 is associated with a media services resource 250 comprises determining that the command 208 is serviceable by one or more media service providers 260, that any one or more media service providers 260 can comprise the requested content associated with the command 208, that the command 208 should be shared with one or more media service providers 260 (for example, for use by the one or more media service providers for statistical or other analysis), or any combination thereof.

At step 906, the media service manager 204 tags one or more commands 208 received by the media service manager 204 based on a privacy parameter. For example, the privacy parameter can indicate that the command 208 and/or the response are associated with private or confidential information (such as personal or financial data), media content (such as a media query for any type of media), otherwise public data and/or information, or any combination thereof. At step 908, the media service manager 204 stores the command 208, for example, in a memory 310. For example, storing the command 208 can comprise determining that the command 208 and/or the response is associated with a tag from step 906 that is indicative of data associated with a media query. The command 208 is then stored based on the determination. For example, the command 208 is stored when the command 208 and/or response is tagged as associated with a media query.

At step S910, the command 208, the response, or both are sent to the network resource 118 for storing at the network resource 118. In this way, the network resource 118 can provide data and/or information (such as the command 208, the response, or both) to one or more media service resources 250, for example, so that the one or more media service resources 250 can utilize the data and/or information to provide the user 180 with a better experience and to provide the user 180 with alternative media resources in response to a media request (such as a command 208).

At step 912, the command 208 is sent to the associated media service resource 250. The media service resource 250 is configured to process, analyze, or otherwise handle the command 208. At step S914, the media service manager 204 receives a response from the associated media service resource 250. The received response is indicative of the processing, analysis, or otherwise handling of the response by the associated media service resource 250. At step 916, the media service manager 204 generates a notification to an output device 114 connected to the control device 102 based on the response. For example, the notification can be a popup message that indicates the reason for the failure or the unsuccessful processing, analysis, or otherwise handling of the command 208 or a message that indicates at least another media service resource 250 is available to process, analyze, or otherwise handle the command 208.

According to one or more example embodiments of inventive concepts disclosed herein, there are provided novel solutions for providing one or more media services based on an input received from a user interface. The control device that includes an command services manager provides a significant improvement over traditional systems as the novel control device not only receives inputs or commands from any one or more sources but also selects a media service resource based on certain criteria, such as any one or more of the criteria discussed with references to FIGS. 1-9. The user has an improved experience as the input or command is directed to a media service resource that is capable of handling the input or command and providing an appropriate response to the user and/or forwarding, sharing or otherwise sending the input or command to another media service resource.

Each of the elements of the present invention may be configured by implementing dedicated hardware or a software program on a memory controlling a processor to perform the functions of any of the components or combinations thereof. Any of the components may be implemented as a CPU or other processor reading and executing a software program from a recording medium such as a hard disk or a semiconductor memory, for example. The processes disclosed above constitute examples of algorithms that can be affected by software, applications (apps, or mobile apps), or computer programs. The software, applications, computer programs or algorithms can be stored on a non-transitory computer-readable medium for instructing a computer, such as a processor in an electronic apparatus, to execute the methods or algorithms described herein and shown in the drawing figures. The software and computer programs, which can also be referred to as programs, applications, components, or code, include machine instructions for a programmable processor, and can be implemented in a high-level procedural language, an object-oriented programming language, a functional programming language, a logical programming language, or an assembly language or machine language.

The term "non-transitory computer-readable medium" refers to any computer program product, apparatus or device, such as a magnetic disk, optical disk, solid-state storage device (SSD), memory, and programmable logic devices (PLDs), used to provide machine instructions or data to a programmable data processor, including a computer-readable medium that receives machine instructions as a computer-readable signal. By way of example, a computer-readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media.

The word "comprise" or a derivative thereof, when used in a claim, is used in a nonexclusive sense that is not intended to exclude the presence of other elements or steps in a claimed structure or method. As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise. Use of the phrases "capable of," "configured to," or "operable to" in one or more embodiments refers to some apparatus, logic, hardware, and/or element designed in such a way to enable use thereof in a specified manner.

While the principles of the inventive concepts have been described above in connection with specific devices, apparatuses, systems, algorithms, programs and/or methods, it is to be clearly understood that this description is made only by way of example and not as limitation. The above description illustrates various example embodiments along with examples of how aspects of particular embodiments may be implemented and are presented to illustrate the flexibility and advantages of particular embodiments as defined by the following claims, and should not be deemed to be the only embodiments. One of ordinary skill in the art will appreciate that based on the above disclosure and the following claims, other arrangements, embodiments, implementations and equivalents may be employed without departing from the scope hereof as defined by the claims. It is contemplated that the implementation of the components and functions of the present disclosure can be done with any newly arising technology that may replace any of the above-implemented technologies. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What we claim is:

1. A command services manager of a control device to receive a command from one or more input devices, comprising:
   a memory storing one or more computer-readable instructions; and
   a processor configured to execute the one or more computer-readable instructions to perform one or more operations to:
      receive the command from the one or more input devices;
      tag the command based on a privacy parameter;
      determine that the command is associated with a media service resource;
      send the command to the associated media service resource, wherein the media service resource processes the command; and
      determine that the command is associated with a tag indicative of data associated with a media query;
      store the command based on the determination that the command is associated with the tag.

2. The command services manager of claim 1, wherein the processor is configured to execute the one or more computer-readable instructions to further perform the one or more operations to:
   send the command to a network resource for storing at the network resource.

3. The command services manager of claim 2, wherein sending the command to the network resource comprises sending a subscriber identifier associated with the command.

4. The command services manager of claim 1, wherein storing the command comprises storing the command as encrypted data based on a key associated with the control device.

5. The command services manager of claim 1, wherein the processor is configured to execute the one or more computer-readable instructions to further perform the one or more operations to:
   receive a response from the associated media service resource; and
   generate a notification to an output device connected to the control device based on the response.

6. The command services manager of claim 5, wherein the notification comprises a message that indicates at least another media service resource available to process the command.

7. The command services manager of claim 1, wherein the processor is configured to execute the one or more computer-readable instructions to further perform the one or more operations to:
   receive one or more commands from the one or more input devices;
   receive one or more privacy parameters from the media service resource;
   tag the one or more commands based on the one or more privacy parameters; and
   storing the one or more commands based on the one or more commands being associated with one or more tags indicative of data associated with one or more media queries.

8. A method for a media services system to provide one or more commands to one or more registered media service providers, the method comprising:
   receiving the command from the one or more input devices;
   tagging the command based on a privacy parameter;
   determining that the command is associated with a media service resource;
   sending the command to the associated media service resource, wherein the media service resource processes the command;
   determining that the command is associated with a tag indicative of data associated with a media query; and
   storing the command based on the determination that the command is associated with the tag.

9. The method of claim 8, further comprising:
   sending the command to a network resource for storing at the network resource.

10. The method of claim 9, wherein sending the command to the network resource comprises sending a subscriber identifier associated with the command.

11. The method of claim 8, wherein storing the command comprises storing the command as encrypted data based on a key associated with the control device.

12. The method of claim 8, further comprising:
    receiving a response from the associated media service resource; and
    generating a notification to an output device connected to the control device based on the response.

13. The method of claim 12, wherein the notification comprises a message that indicates at least another media service resource available to process the command.

14. The method of claim 8, further comprising:
    receiving one or more commands from the one or more input devices;
    receiving one or more privacy parameters from the media service resource;
    tagging the one or more commands based on the one or more privacy parameters; and
    storing the one or more commands based on the one or more commands being associated with one or more tags indicative of data associated with one or more media queries.

15. A non-transitory computer-readable medium of an command services manager of a control device storing one or more instructions for receiving a command, which when executed by a processor of the control device, cause the command services manager to perform one or more operations comprising:
    receiving the command from the one or more input devices;
    tagging the command based on a privacy parameter;
    determining that the command is associated with a media service resource;
    sending the command to the associated media service resource, wherein the media service resource processes the command;
    determining that the command is associated with a tag indicative of data associated with a media query; and
    storing the command based on the determination that the command is associated with the tag.

16. The non-transitory computer-readable medium of claim 15, wherein the one or more instructions when further executed cause the command services manager to perform one or more further operations comprising at least one of:
    sending the command to a network resource for storing at the network resource; and
    receiving a response from the associated media service resource and generating a notification to an output device connected to the control device based on the response.

17. The non-transitory computer-readable medium of claim 16, wherein sending the command to the network resource comprises sending a subscriber identifier associated with the command.

18. The non-transitory computer-readable medium of claim 16, wherein the notification comprises a message that indicates at least another media service resource available to process the command.

19. The non-transitory computer-readable medium of claim 15, wherein storing the command comprises storing the command as encrypted data based on a key associated with the control device.

20. The non-transitory computer-readable medium of claim 15, wherein the one or more instructions when further executed cause the command services manager to perform one or more further operations comprising:
   receiving one or more commands from the one or more input devices;
   receiving one or more privacy parameters from the media service resource;
   tagging the one or more commands based on the privacy parameters; and
   storing the one or more commands based on the one or more commands being associated with one or more tags indicative of data associated with one or more media queries.

* * * * *